(12) United States Patent
Lugmair et al.

(10) Patent No.: US 6,627,571 B1
(45) Date of Patent: Sep. 30, 2003

(54) METHOD AND SYSTEM FOR THE SITU SYNTHESIS OF A COMBINATORIAL LIBRARY OF SUPPORTED CATALYST MATERIALS

(75) Inventors: Claus G. Lugmair, San Jose, CA (US); Damodara M. Poojary, Cupertino, CA (US); Alfred Hagemeyer, Sunnyvale, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/516,669

(22) Filed: Mar. 1, 2000

(51) Int. Cl.$^7$ ................................................ B01J 35/00
(52) U.S. Cl. .................... 502/2; 502/439; 502/527.14; 502/527.23; 502/527.24; 502/180; 502/232; 502/300; 502/349; 502/358; 502/355
(58) Field of Search ..................... 502/2, 439, 527.14, 502/527.23, 527.24, 180, 232, 300, 349, 350, 355; 436/37

(56) References Cited

U.S. PATENT DOCUMENTS

| | | |
|---|---|---|
| 3,559,960 A | 2/1971 | Elder et al. |
| 4,250,346 A | 2/1981 | Young et al. |
| 4,920,056 A | 4/1990 | Dasgupta |
| 5,049,509 A | 9/1991 | Szakasits et al. |
| 5,143,854 A | 9/1992 | Pirrung et al. |
| 5,288,514 A | 2/1994 | Ellman |
| 5,304,354 A | 4/1994 | Finley et al. |
| 5,356,756 A | 10/1994 | Cavicchi et al. |
| 5,415,841 A | 5/1995 | Dovichi et al. |
| 5,416,613 A | 5/1995 | Rolleston et al. |
| 5,422,079 A | 6/1995 | Parekh et al. |
| 5,424,186 A | 6/1995 | Fodor et al. |
| 5,492,831 A | 2/1996 | Ranger |
| 5,585,136 A | 12/1996 | Barrow et al. |
| 5,593,642 A | 1/1997 | DeWitt et al. |
| 5,776,359 A | 7/1998 | Schultz et al. |
| 5,895,769 A | 4/1999 | Lai |
| 5,959,297 A | 9/1999 | Weinberg et al. |
| 5,985,356 A | 11/1999 | Schultz et al. |
| 6,004,617 A | 12/1999 | Schultz et al. |
| 6,013,199 A | 1/2000 | McFarland et al. |
| 6,015,880 A | 1/2000 | Baldeschwieler et al. |
| 6,030,917 A | 2/2000 | Weinberg et al. |
| 6,034,240 A | 3/2000 | La Pointe |
| 6,034,775 A | 3/2000 | McFarland et al. |
| 6,043,363 A | 3/2000 | LaPointe et al. |
| 6,045,671 A | 4/2000 | Wu et al. |
| 6,063,633 A | 5/2000 | Willson, III |
| 6,149,882 A | 11/2000 | Guan et al. |
| 6,326,090 B1 | 12/2001 | Schultz et al. |
| 6,514,764 B1 | 2/2003 | Willson, III |

FOREIGN PATENT DOCUMENTS

| | | |
|---|---|---|
| DE | 19806848 | 8/1999 |
| DE | 198 09 477 A 1 | 9/1999 |
| EP | 0166438 B1 | 11/1987 |
| WO | WO 90/15070 | 12/1990 |
| WO | WO 92/10092 | 6/1992 |
| WO | WO 97/32208 | 9/1997 |
| WO | WO 98/07026 | 2/1998 |
| WO | WO 98/15969 | 4/1998 |
| WO | WO 99/19724 | 4/1999 |
| WO | WO 99/34206 | 7/1999 |
| WO | WO 99/41005 | 8/1999 |
| WO | WO 99/59716 | 11/1999 |
| WO | WO 00/09255 | 2/2000 |
| WO | WO 00/17413 | 3/2000 |
| WO | WO 00/51720 | 9/2000 |

OTHER PUBLICATIONS

Copending application, Ser. No. 09/727,890 filed Nov. 28, 2000 entitled Catalyst Testing Process with In–Situ Synthesis.

Brinker and Schere, "Sol–Gel Science: The Physics and Chemistry of Sol–Gel Processor," (Academic Press, Inc. 1990) (Excerpts), No month.

Simons, "High–throughput Experimentation Techniques for the Preparation and Testing of Supported Precious Metal Catalysts in Liquid–Phase Hydrogenation", Topics in Catalysis, Jan. 2000, vol. 13, No. 3, pp. 201–203.

Hoffman et al., "Parallel Synthesis and Testing of Catalysts under Nearly Conventional Testing Conditions", Sep. 17, 1999 (vol. 38 Issue 18).

Pending patent application, Ser. No. 09/727,890, filed Nov. 28, 2000, entitled Catalyst Testing Process With In–Situ Synthesis (2000–046DIV8).

Reddington, Erik et al., "Combinatorial Electrochemistry: A Highly Parallel, Optical Screening Method for Discovery of Better Electrocatalysts", Science, Jun. 12, 1998, pp. 1735–1737, v. 280.

EP 01 10 5047 Search Report dated Jul. 12, 2001.

EP 01 10 5047 Search Report dated Sep. 20, 2001.

Choi et al., "Combinatorial Methods for the Synthesis of Aluminophosphate Molecular Sieves," Angew. Chem. Int. Ed. 1999, 38, No. 19, pp. 2891–2894 (1).

Geysen et al., "Strategies for epitope analysis using peptide synthesis," *J. Immun. Meth.* 102:259–274 (1987) (1).

Senkan, Selim et al, "High–Throughput Testing of Heterogeneous Catalyst Libraries Using Array Microreactors and Mass Spectrometry," Angew. Chem. Int. Ed. 1999, 38, No. 18, pp. 2794–2799(1).

(List continued on next page.)

Primary Examiner—Elizabeth Wood
(74) *Attorney, Agent, or Firm*—Dobrusin & Thennisch PC

(57) ABSTRACT

A method and system for the in situ synthesis of a combinatorial library including impregnating a first component with a second component. The method and system advantageously may be employed in the synthesis of materials for screening for usefulness as a catalyst.

48 Claims, 3 Drawing Sheets

OTHER PUBLICATIONS

Xiao–Dong Sun, Kai–an Wang, Young Yoo, William G. Wallace–Freedman, Chen Gao, Xiao–Dong Xiang, and Peter G. Schultz—"Solution–Phase Synthesis of Luminescent Materials Libraries," Adv. Mater. 1997, 9, No. 13, pp. 1046–1049 (1).

Christian Hoffman, Anke Wolf and Ferdi Schuth, "Parallel Synthesis and Testing of Catalysts Under Nearly Conventional Testing Conditions," Angew. Chem. Int. Ed. 1999, 38, No. 18, pp. 2800–2803 (1).

John M. Newsam and F. Schuth, "Combinatorial Approaches As a Component of High–Throughput Experimentation (HTE) in Catalysis Research," Biotechnology and Bioengineering (Combinatorial Chemistry, vol. 61, No. 4, 1998/1999, pp. 203–216(1).

Keith E. Simons, "The Applications of High Throughput Experimentation Techniques for the Preparation and Testing of Supported Precious Metal Catalysts," Agnew. Chem. Int. Ed. 1999, 38, No. 18, pp. 2800–2803 (1).

Copending U.S. application Ser. No. 09/300,634 filed Apr. 27, 1999.

METHOD AND SYSTEM FOR THE SITU SYNTHESIS OF A COMBINATORIAL LIBRARY OF SUPPORTED CATALYST MATERIALS

FIELD OF THE INVENTION

The present invention generally relates to methods for the creation of an array of materials at known locations on a substrate surface, and more specifically to methods for the creation of an array of materials for screening for useful heterogeneous catalytic properties.

BACKGROUND OF THE INVENTION

The discovery of new materials with novel chemical and physical properties often leads to the development of new and useful technologies. Over forty years ago, for example, the preparation of single crystal semiconductors transformed the electronics industry. Currently, there is a tremendous amount of activity being carried out in the areas of catalysis, superconductivity, magnetic materials, phosphors, nonlinear optics and high strength materials. Unfortunately, even though the chemistry of extended solids has been extensively explored, few general principles have emerged that allow one to predict with certainty composition, structure and reaction pathways for the synthesis of such solid state compounds, compositions or structures. Moreover, it is difficult to predict a priori the physical properties a particular three-dimensional structure will possess.

Clearly, the preparation of new materials with novel chemical and physical properties is at best happenstance with our current level of understanding. Consequently, the discovery of new materials depends largely on the ability to synthesize and analyze new materials, compounds, compositions or structures. Given approximately 100 elements in the periodic table that can be used to make such compositions consisting of three, four, five, six or more elements, the universe of possible new compounds remains largely unexplored. As such, there exists a need in the art for a more efficient, economical and systematic approach for the synthesis of possibly new compounds, compositions or structures (e.g., materials) and for the screening of such materials for useful properties, particularly materials useful for heterogeneous catalysis.

Pirrung, et al., have developed a technique for generating arrays of peptides and other molecules using, for example, light-directed, spatially-addressable synthesis techniques (see, U.S. Pat. No. 5,143,854 and PCT Publication No. WO 90/15070, incorporated herein by reference for all purposes; see also, Geysen et al, *J. Immun. Meth*. 102:259–274 (1987), incorporated herein by reference for all purposes). In addition, Fodor, et al. have developed, among other things, a method of gathering fluorescence intensity data, various photosensitive protecting groups, masking techniques, and automated techniques for performing light-directed, spatially-addressable synthesis techniques (see, Fodor, et al., PCT Publication No. WO 92/10092, the teachings of which are incorporated herein by reference for all purposes). Schultz et al., in U.S. Pat. No. 5,985,356 entitled "Combinatorial Synthesis of Novel Materials" disclose methods for preparing and screening arrays of materials for combinatorial material science applications such as catalysis, and is incorporated herein by reference. See also, e.g., U.S. Pat. Nos. 5,288,514 and 5,424,186, incorporated by reference herein.

Solution-based methods, such as the sol-gel process, are widely used for the synthesis of inorganic materials. An example of one system for the formation of combinatorial libraries is disclosed in commonly owned co-pending U.S. patent application Ser. No. 09/156,827 entitled "Formation of Combinatorial Arrays of Materials using Solution-Based Methodologies", hereby expressly incorporated by reference. See also, WO 98/15969, hereby incorporated by reference. Also, of potential interest to the present invention are U.S. Pat. No. 5,959,297 "Mass Spectrometers and Methods for Rapid Screening of Libraries of Different Materials", U.S. Pat. No. 5,585,136, "Method for Producing Thick Ceramic Films by a Sol Gel Coating Process", U.S. patent application Ser. No. 60/122,704 entitled "Chemical Processing Microsystems, Diffusion-Mixed Microreactors and Methods for Preparing and Using Same", and Choi et al., "Combinatorial Methods for the Synthesis of Aluminophosphate Molecular Sieves," Angew. Chem. Int. Ed. 1999, 38, No. 19 (2891–2894), each of which are hereby incorporated by reference.

This invention provides methods for the synthesis of combinatorial libraries or arrays on or in suitable substrates by effectively utilizing a certain combination of steps. The invention can be used to make known materials or new materials. In addition, this invention provides a general route for the synthesis of arrays of transition metal and other oxides for screening for heterogeneous catalytic properties.

SUMMARY OF THE INVENTION

In one aspect, this invention provides a method for forming an array of supported materials for screening as catalysts by providing a first component (preferably a catalyst carrier or support in its solid state) and impregnating the first component with a second component (preferably a catalyst precursor delivered in a fluid medium). The steps are repeated to generate a plurality of impregnated materials. The impregnated materials preferably are separated into individual regions on a substrate, and treated to form an array having a plurality of different materials.

Materials that can be prepared using the methods of the present invention include, for example, supported catalyst materials. Once prepared, these materials can be screened for useful catalytic properties using techniques such as high throughput screening techniques.

In the context of catalyst material synthesis, it is thus believed that the present invention will yield materials that have a structure and reactivity more closely approximating those of bulk catalysts. The present invention also readily permits for the use of high throughput screens to identify good catalyst support materials. The present invention permits for the use of a broad variety of precursor solutions, the effect of the selection of which can be readily screened. Such precursor solutions (e.g., without limitation, nitrates, acetates, oxalates, halides, or mixtures thereof) can be prepared in relatively high concentrations, allowing for relatively high catalyst loading on the substrate.

DETAILED DESCRIPTION OF PREFERRED EMBODIMENT

Figure 1A:
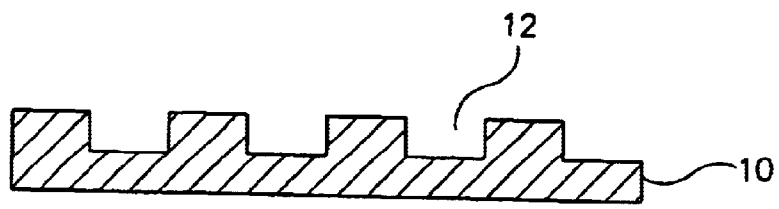
FIGS. 1a–1c are sectional views illustrating a portion of certain examples of substrates in accordance with the present invention.

The following terms are intended to have the following general meanings as they are used herein:

Region: A region is a localized area on a substrate intended to be used for formation of a selected material and is otherwise referred to herein in the alternative as a "known" region, "reaction" region, "selected" region, "individual" region, or simply a "region." The region may have any convenient shape, e.g., circular, rectangular, elliptical, wedge-shaped, etc. A discrete region and, therefore in some embodiments, the area upon which each distinct material is synthesized is smaller than about 25 $cm^2$, preferably less than 10 $cm^2$, more preferably less than 5 $cm^2$, even more preferably less than 1 $cm^2$, still more preferably less than 1 $mm^2$, and even more preferably less than 0.5 $mm^2$. In most preferred embodiments, the regions have an area less than about 10,000 $\mu m^2$, preferably less than 1,000 $\mu m^2$, more preferably less than 100 $\mu m^2$, and even more preferably less than 10 $\mu m^2$. In general, the regions are spatially addressable. In certain embodiments, the regions are discrete. For instance, the regions are separated from each other so that a material in a first region cannot interdiffuse with a material in a second region and thus the regions have a minimum size. This separation can be accomplished in many ways, which are discussed below. In other embodiments, the regions are continuous.

Component: In general, a "component" can be an element, compound or composition. The component may be provided as a solid, liquid, sol-gel, uniform or non-uniform dispersion (e.g., slurry), colloidal suspension, vapor, or otherwise. In one aspect of the present invention a "first component" can function as a catalyst support (or carrier), and a "second component" can have catalytic activity for a particular chemical reaction of interest or can be a precursor to a component having such catalytic activity (generally referred to herein as a catalyst precursor). The first component can, in addition to its support functionality, also have catalytic activity for the chemical reaction of interest or be a precursor to a component having such activity. Catalytic activity in the first, support component can be complementary, restrictive, or synergistic with the catalytic activity of the second, catalyst component. The first and second components are contacted, and can be further processed (e.g., dried) or treated (e.g., calcined) as described hereinafter, together with examples of specific components.

Substrate: A material having a rigid or semi-rigid surface. In many embodiments, at least one surface of the substrate will be substantially flat (and the substrate will contain no discrete regions), although in some embodiments it may be desirable to physically separate regions for different materials with, for example, dimples, wells, raised regions, etched trenches, or the like. In some embodiments, the substrate itself contains wells, raised regions, etched trenches, etc., which form all or part of the regions (for example a microtiter plate). The regions may be coated (e.g., silanized) or not. By way of example, the substrate may be a wafer, e.g., an elongated thin member, or it may be a member having a larger thickness (such as a metal plate with apertures defined therein or a tray containing an array of reaction sites or microreactors). Surface texture or topology of the substrate may be varied as desired to provide a suitable amount of surface area. The substrate is preferably suitable for use and can maintain its structural integrity under reaction conditions suitable for heterogeneous reactions, typically including temperatures ranging from about ambient temperature to about 1000° C., more typically from about 100° C. to about 700° C., and most typically from about 200° C. to about 500° C., and pressures ranging from about atmospheric pressure to about 200 bar. The substrate can also be adapted for use in a particular reactor configuration for screening purposes, as discussed below.

To illustrate aspects of the present invention, the drawings of FIGS. 1 through 3 illustrate specific examples, without limitation, of the many substrates of the present invention, along with certain of the many ways for providing a first and second component in accordance with the methods of the present invention. The skilled artisan will appreciate that these drawings are not intended as limiting, inasmuch as numerous combinations thereof may be employed, which are not shown. Moreover, many configurations of the substrates may be employed which likewise are not shown.

Figure 1B:
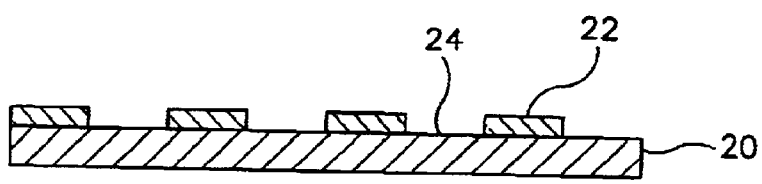
Figure 1C:
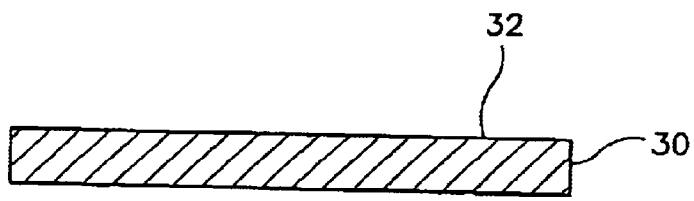

Referring to FIGS. 1a–1c, there are depicted three popular examples of the many types of substrates for which the present invention finds utility. FIG. 1a illustrates an example of a substrate 10 that has a plurality of wells 12 defined therein for receiving the components of the present invention. FIG. 1b illustrates an example of a substrate 20 that has a plurality of coated regions 22 over a first surface 24 of the substrate 20, it being appreciated that the entire surface 24 or other select portions thereof may be coated in any desired manner. FIG. 1c illustrates an example of a substrate 30 having a first surface 32 for receiving one or more components in accordance with the methods of the present invention.

Figure 2A:
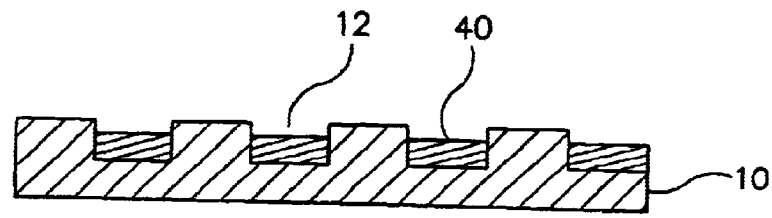
FIGS. 2a–2d are sectional views illustrating a portion of certain examples of substrates in accordance with the present invention that have a first component for supporting a catalytically active material or a precursor thereof provided thereon.
Figure 2B:
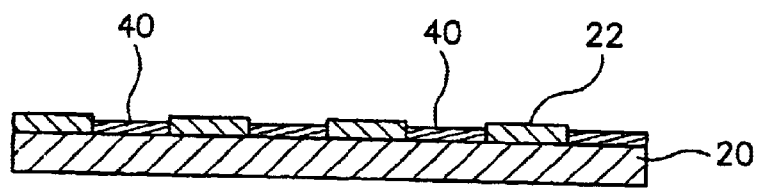
Figure 2C:
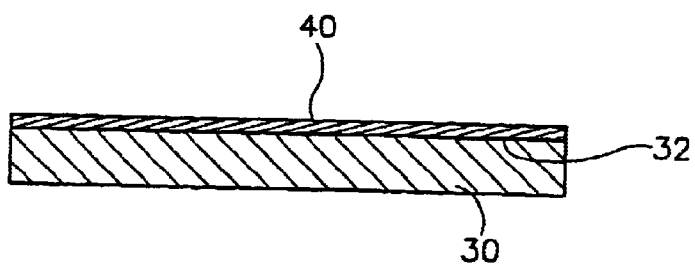
Figure 2D:
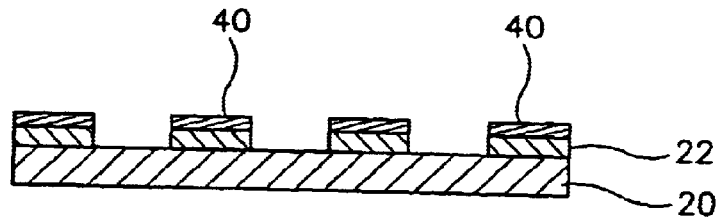
Figure 3A:
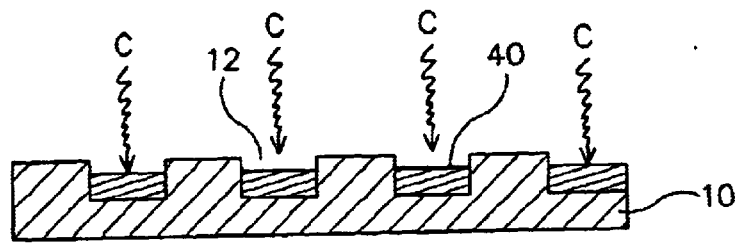
FIGS. 3a–3d are sectional views illustrating a portion of certain examples of substrates in accordance with the present invention that have a first component for supporting a catalytically active material or a precursor thereof provided thereon, and further illustrating contacting the first component with a catalytically active material or a precursor thereof.
Figure 3B:
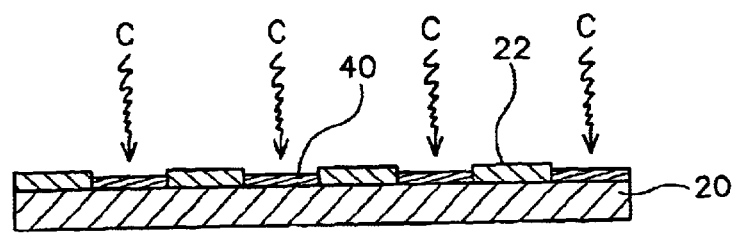
Figure 3C:
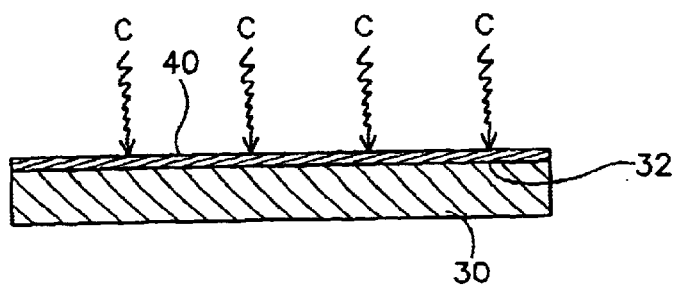
Figure 3D:
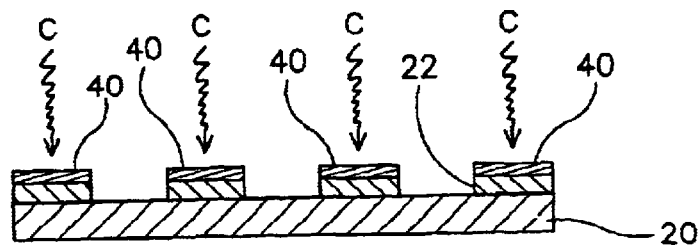

Referring to FIGS. 2a–2d, there are shown examples of how a first component 40 (e.g., preferably a first component for supporting a catalytically active material or a precursor thereof; or which itself is catalytically active) may be provided to the substrates of FIGS. 1a–1c. FIG. 2a illustrates the introduction of the first component 40 into wells of the substrate. FIG. 2b illustrates the introduction of the first component 40 into the regions between the coated regions 22 on the substrate 20. FIG. 2c illustrates coating substantially the entire first surface 32 of the substrate 30 with the first component 40. Of course, it is possible that only a portion of the first surface 32 is coated with the first component FIG. 2d illustrates coating the coated regions 22 of the substrate 20, instead of or in addition to coating the regions between such coated regions 22 as in FIG. 2b.

Other combinations and coating protocols may be employed as desired, as the skilled artisan will appreciate.

Shown in FIGS. 3a–3d are the embodiments of FIGS. 2a–2d, but also depicting the provision of a second component, preferably a catalytically active material or a precursor thereof, which is denoted for purposes of the present discussion as C. In creating arrays in accordance with the present invention it is frequently desirable to vary the compositions, thickness or stoichiometry of the C components, the first component 40 or a combination thereof. It is also possible to vary the reaction environment conditions from region to region to create different materials or materials with different properties. By way of illustration, with particular reference to the selection of the chemistry of the first and second components, it is possible that the first component is constant across the substrate, but the second component is varied region to region. Likewise it is possible to vary the first component across the substrate, but maintain the second component constant. Moreover, it is possible to vary both the first and second components across the substrates.

The skilled artisan will appreciate that the present illustrations are not intended as restrictive, and that many variations of the substrate structures, providing steps and sequences of providing, are possible, all within the scope of the present invention. For example, the order in which the first and second components are introduced may be varied. Elements or compounds of the first or second component may be introduced into the other component prior to introduction of the component to the substrate. The first component may be impregnated into the second component, or vice versa.

Unless otherwise specified, for purposes of the present discussion, the use of a metal (e.g., in a fluid medium) also encompasses the use of the ionic form (e.g., salt) of the metal.

In general, the method and system of the present invention contemplates forming an array of materials, and includes impregnating a catalyst carrier on a substrate with a catalyst precursor. The array of materials can be an array of supported catalyst materials or catalyst candidate materials to be screened for catalytic activity, selectivity, conversion, and/or yield with respect to one or more reactions of interest. Hence, in one particularly preferred embodiment, the method and system of the present invention is employed to discover improved inorganic solids, and more particularly, to discover improved catalysts. To use this invention to discover catalysts, in one embodiment, arrays of catalyst materials can be prepared from support components (and/or precursors thereof) and catalytic components (and/or precursors thereof) by automated deposition techniques, and particularly automated liquid dispensing techniques. The array of supported catalyst materials or catalyst candidate materials are preferably formed in situ on the substrate. Advantageously, where the substrate is or can be adapted for use in connection with a catalytic screening system, the in situ preparation of the supported materials allows for an efficient workflow. Specifically, libraries of combinatorial materials can be prepared as described herein, and subsequently screened while resident on the substrate—preferably without having to further transfer off of the substrate or otherwise handle the materials on an individual basis. Further aspects of combinatorial materials science research are disclosed in references cited herein. See, generally for example, U.S. patent application Ser. No. 09/156,827, hereby incorporated by reference, entitled "Formation of Combinatorial Arrays of Materials Using Solution Based Methodologies." As such, this invention provides useful methods for a combinatorial materials science research program for the discovery of novel catalysts. Catalyst materials of the invention can be prepared using rapid-serial or parallel synthesis methods, analyzed in situ during a chemical reaction of interest, and directly evaluated for catalytic performance.

The Components

The components may be selected to form a desired catalytic material or may be selected to explore a compositional range or phase space potentially useful as a catalytic material (i.e., a catalyst candidate material). Components are typically selected from commercially available atoms, molecules, compounds or complexes having a desired element that would render the component suitable for use as a catalyst. Components typically are in a solid or liquid state.

Selection of the components will depend largely upon the intended use of the component. By way of example, in one preferred two component system, the first component is intended to serve as and is suitable for use as a catalyst support or carrier. Thus, for that particular component, it is desirable that the component exhibits or develops a relatively high surface area in its solid state. Thus, preferably a particulated solid, such as a powdered ceramic compound can be used. Also in that embodiment, it is preferred that the second component is a catalytically active component or a precursor thereof, and more preferably one supplied in a non-solid form (e.g., as a liquid, solution, gel, dispersion, suspension, etc). The first component and second component, optionally following further processing and/or treatment, can be subjected to reactive conditions, in the presence of reactant materials. Their catalytic properties can then be analyzed.

In a particularly preferred embodiment, the first component is one or more inorganic compound that is chemically inert or catalytic, preferably one containing a metal (e.g., an oxide, nitride, carbide, sulfate, phosphate) or active carbon, and still more preferably it is a ceramic. In a highly preferred embodiment, the first component is a metallic oxide, such as a known catalyst carrier or support. Advantageously, commercially available catalyst carriers or supports may be employed. Such catalyst carriers are widely available, as the skilled artisan would appreciate, from vendors such as MEI Chemicals. Examples of preferred support compounds include, for instance zeolites, carbon, oxides of zirconium, nickel, silicon, titanium, aluminum, cerium, yttrium, niobium, tantalum, tungsten, magnesium, calcium or mixtures thereof. In general, the support components can have any suitable geometry or shape. In some embodiments, the support materials are preferably in the shape of beads, such as substantially spherical beads, and are in any case preferably of substantially uniform size. In one case for example, the diameter of the substantially spherical beads can vary by less than about 25%, more preferably less than about 10%, and most preferably less than about 5%, on average, relative to other beads in a representative sample. Such substantially uniform beads can be obtained, for example, from the Leverhulme Center for Innovative Catalysis (LCIC) (Liverpool, England). Depending upon the reaction of interest, the pH can be acidic, basic or neutral. Regardless of its chemistry, the catalyst carrier should exhibit sufficient ability to adhere to regions on the substrate (whether coated, physically divided into regions or not). For instance, typically a suitable amount of a binder (e.g., up to about 5% by weight) of starch, methylcellulose, aluminum phosphate, barium sulfate of the like is added to assist in adhesion.

In such a preferred embodiment, the second component preferably is a metal, metal salt, metal oxide, metal alloy or mixtures thereof. The second component can be provided as a catalytically active component or as a catalyst precursor. For one preferred embodiment in which a supported catalyst is desired to be prepared, the first component can be a metal oxide (itself inert or catalytically active), and the second component can be provided as an aqueous or organic metal solution or dispersion, preferably one from which the liquid phase (e.g., solvent) can be readily removed (e.g., by evaporation) or otherwise driven off (e.g., to yield a salt). Examples of such preferred precursors include, without limitation, solutions of oxides, alkoxides, aryloxides, allyloxides, diketonates, oxalkoxides, oxoaryloxides, oxodiketonates, phosphates (e.g., those of Al, Zr or V), phosphines, acetates, oxalates, tartrates, citrates, carbonates, halides, sulfates, nitrites, nitrates, hydroxides, amines, amides, imides, carbonyls, metals, carboxylates, or mixtures thereof. In some embodiments, the second component may be the same as the first component.

The skilled artisan will appreciate that the above is a listing of but some of the many contemplated components. Variations of each of the above components are possible, and are within the scope of the methods of the present invention, particularly where the methods employed result in the formation of a supported heterogeneous catalyst library on a substrate.

Thus, the skilled artisan will appreciate that either the first or second component may be independently selected from the group consisting of oxides, alkoxides, aryloxides, allyloxides, diketonates, oxoalkoxides, oxodiketonates, phosphates, phosphines, acetates, oxalates, sulfates, tartrates, citrates, nitrites, nitrates, hydroxides, amines, amides, imides, carbonates, carbonyls, halides, oxyhalides, zeolites, metals and carboxylates and combinations thereof.

Moreover, it will be appreciated by the skilled artisan that the first and second components are selected so that the resulting material will typically have a metal or metalloid element selected from the group consisting of Groups 1–17, Lanthanides and Actinides of the Periodic Table of Elements. More specifically, at least one of the components will include one or more element selected from the group consisting of Li, Na, K, Rb, Cs, Mg, Ca, Sr, Ba, Sc, Y, La, Ti, Zr, Hf, V, Ta, Cr, Mo, W, Ru, Os, Ir, Fe, Ni, Pt, Co, Cu, Ag, Au, Zn, Cd, Rh, Pd, P, As, S, Se, Te, Mn, Nb, Re, B, Al, Si, Ga, Ge, In, Sn, Sb, Tl, Pb, Bi, Lu, Ce, Pr, Nd, Sm, Eu, Gd, Tb, Dy, Ho, Er, Tm, Yb, Be, Hg, Pm, B, C, N, and mixtures thereof.

It will be appreciated that according to the combinatorial methods outlined herein, the first and second components can be varied in concentration, stoichiometry or thickness across the substrate in the preparation of arrays. Thus, it is possible that one or more regions will include the same first or second component.

Delivery of First Component to Substrate

In a preferred embodiment, a substrate is provided. A first component (preferably, one capable of functioning as a catalyst carrier or support) is placed or deposited in one or more regions on the substrate (or optionally over the entire substrate). Likewise the first component may be suitably provided as a film (thick or thin), such as by any suitable film-forming technique (e.g., dipping, coating, spraying, vapor deposition, or otherwise). For example, it is possible that a substrate with or without wells is coated with a film comprising the first support component over some portion or all of a surface of the substrate.

The first component is placed on the substrate in a manner preferably so that the resulting mass of such material has a relatively high amount of surface area per unit volume. This may be accomplished in any suitable manner, for instance, it is achieved in a single step by the use of a plurality of metal oxide particles that are shaped or packed and delivered to the substrate, so that a porous support for heterogeneous catalysis is formed. Alternatively, subsequent processing steps (e.g., mechanical deformation steps) may be employed in situ on the material to increase its surface area per unit volume in situ. In this manner, it is possible to achieve within a unit volume a relatively high amount of surface area of such oxide in contact with the second component, when the second component is impregnated in the first component.

It will be appreciated that various forms of the first component may be employed for delivery of the first component to the substrate including, for instance, particulates (e.g. powders or pellets) or shaped carriers that have been ground to the appropriate particle size. The first component may be delivered in a solid state or in a fluid state, such as for instance as part of a colloidal suspension, sol-gel or slurry. Of course, it is possible that delivery is accomplished by other vehicles, such as without limitation solutions, dispersions, emulsions or the like. When the first component is delivered by a liquid medium, it is contemplated that the properties of the liquid medium may be controlled, adjusted or otherwise tuned as desired with appropriate agents to alter its viscosity, surface or wetting characteristics and facilitate handling of such medium.

A colloidal suspension, for example, typically employs nanoparticles (e.g., from about 1 to about 100 nm, and more preferably about 20 to about 40 nm) in solution, which are stabilized to prevent agglomeration of the nanoparticles. Colloidal suspensions are available commercially and can be liquid dispensed in accordance with the present invention. Upon dispensing, water is removed and particle agglomeration is induced by either drying or introducing an acid or base to remove the stabilizer. Calcining may also be employed to decompose any organic stabilizers.

Sol-gel methods often describe many different chemical processes. In general, the sol-gel approach provides mixing in solution through the formation of a colloidal dispersion or sol. Hydrolytic linking and continued condensation results in the formation of an interconnected, rigid network, or gel which may be converted to the desired material through drying and calcination. For a general discussion of sol-gel processes see Brinker and Scherer, "Sol-Gel Science: The Physics and Chemistry of Sol-Gel Processing" (Academic Press, Inc. 1990), herein incorporated by reference for all purposes. Drying typically results in an amorphous mixed metal-organic solid. Thereafter, heat-treatment results in a solid. Optionally, sintering thereafter results in a more completely crystalline material. For example, a liquid alkoxide (e.g., tetra-ethoxysilane) is hydrolyzed by heating in a moist atmosphere. A sol forms that converts to a solid, as water is driven out of the system. It is also possible to start with a solid.

Delivery by slurry typically will involve the dispersion in a liquid medium of particulates of the first component. A suitable amount of the slurry is delivered to a region on the substrate and dried to remove the liquid. Alternatively, the slurry may be dried first and the particulated material transferred to the substrate. Particulate size may vary, but typically ranges from about 0.01 micron to about 300 microns, preferably from about 0.1 $\mu$m to about 100 $\mu$m, and most preferably from about 1 $\mu$m to about 20 $\mu$m.

Any liquid delivery media employed (as with all liquid media of the present invention) should have a viscosity sufficient to stabilize or suspend the component for a sufficient amount of time to achieve deposition of the component across the substrate as desired, without substantially affecting the concentration. Moreover, the viscosity is sufficient to enable fluid passage as desired through the dispensers of a delivery device. The liquid media otherwise has a suitable surface tension to permit the desired wetting and spreading onto the surface to which it is deposited. As discussed elsewhere, various agents can be added to affect the fluid properties, as the skilled artisan will appreciate. Further discussion on regulating local surface free energy of liquids can be found herein within the section entitled "Alternative Substrate Embodiments."

In one alternative embodiment, a solid support component is packed into four or more wells of a first substrate, with the first substrate having a substantially planar top surface between the tops of the four or more wells. Excess solid support component is removed from the first substrate by substantially leveling the packed support component in the four or more wells with the top surface of the first substrate. The leveled, packed supports are transferred into four or more wells of a second substrate, the spatial arrangement of the four or more wells of the second substrate substantially corresponding to the spatial arrangement of the four or more wells of the first substrate and having a depth that is less than the depth of the corresponding four or more wells of the first substrate. The second substrate also has a substantially planar top surface between the tops of the four or more wells. Excess solid support component is removed from the second substrate by substantially leveling the packed support component in the four or more wells with the top surface of the second substrate.

Delivery of Second Component to Substrate

In one preferred embodiment, the second component (a component having catalytic activity or a precursor thereof (sometimes referred to herein as a catalytic component or catalyst precursor)), can be provided and impregnated into the mass of the first component by introducing the second component into the interstices of the mass defined by solid surfaces of the first component. The order of addition between the first component and the second component is not, however, critical to the invention. That is, although it is generally preferred to initially provide the first component to the substrate, and then to impregnate the first component with the second component while the first component is resident on the substrate, the invention also includes the embodiment in which the second component is initially provided to the substrate, and the first component is then added thereto and impregnated by the second component (typically in a solution or other liquid-phase media). Though solid state impregnation is contemplated as within the scope of the present invention, the impregnation is accomplished by providing the second component in a fluid non-solid state medium (e.g., liquid, vapor, etc.). Such medium can be dispensed using commercially available automated liquid dispensing systems, such as those offered by CAVRO Scientific Instruments (e.g., Model NO. RSP9652) or BioDot (Microdrop Model 3000). The impregnation can be effected by capillary action of the liquid medium into the pores and interstices of the support component (e.g., incipient wetness protocols). In general, the medium thus allows the second component to penetrate the mass of the first component and accomplish substantially wetting of the solid surfaces of the first component either homogenously throughout the entire mass or otherwise to selective or controllable desired locations within the mass.

In a particularly preferred embodiment, the second component is provided in a liquid medium which is introduced (e.g., injected) into the mass of the first component. Upon driving off the liquid, the second component remains in contact with the first component. Examples of suitable liquid media include, without limitation, solutions, slurries, dispersions, emulsions, sol-gels, and colloidal suspensions. The liquid medium is tuned as desired with appropriate agents to alter its viscosity, surface or wetting characteristics and facilitate deposition of such medium onto the substrate.

Where substantially homogenous wetting is sought throughout the mass, including the first component, the amount of the fluid added to the mass including the first component preferably is sufficient so that substantially all of the free surfaces of the mass are contacted by the fluid, and the pore volume is filled. Thus, by way of illustration, for a porous mass having a total pore volume of about 1 microliter, preferably at least about 1 microliter of the fluid is impregnated in the mass. Greater or lesser amounts may also be employed, as the skilled artisan will appreciate, to take into account variations in pore volume calculated due to the presence of both inter particle and intra particle pore volume.

Delivery Systems

Prior to dispensing components, mixing may be desired in preparing libraries. Mixing is accomplished in any one of many manual or automatic methods. Mixing can be manual such as by shaking the vessel or well. Mixing can also be automatic such as by using an inert ball bearing in a shaken vessel or array of vessels, such as a titer plate. Mixing can also be accomplished via a dispenser that repeatedly aspirates and dispenses some or all of the contents of a vessel or well. In a preferred embodiment, mixing is performed in the nozzle of an automatic dispensing robot that repeatedly aspirates and dispenses some or all of the contents of a vessel or well. Other mixing methods include agitation of the solution with a gas stream, diffusion, sonication or other agitation techniques known to those skilled in the art.

Dispensing or delivery of the components to the regions can be accomplished in any one of a number of manual or automated methods. One preferred method and system for generating a combinatorial library involves the employment of automated systems driven by suitable software, such as LIBRARY STUDIO™, by Symyx Technologies, Inc. (Santa Clara, Calif.); IMPRESSIONIST™, by Symyx Technologies, Inc. (Santa Clara, Calif.); or a combination thereof. The skilled artisan will appreciate that these systems can be adapted for use in the present invention, taking into account the disclosures set forth in commonly-owned copending U.S. patent application, Ser. Nos. 09/174,856 and 09/305,830, each of which is hereby incorporated by reference.

By way of illustration, without limitation, a system for preparing an array in accordance with the present invention, includes a container for liquid to be dispensed, a pump system in pumping communication with a valve system. The valve system includes one or more valves (e.g., solenoid valves, such as Microdrop Model 3000 available from BioDot Inc.) adapted so that liquid from the container can be drawn into a dispenser (e.g., a syringe or ink jet dispenser having a nozzle) connected to the valves from negative pressure generated by the pump system. The liquid in the container can then be dispensed onto a substrate, which is preferably held on a mounting surface of a motion plate. In one preferred embodiment, the valve system portion including dispensers is movable in the x, y and z directions and the mounting surface and motion plate is movable in at least the x and y directions, thereby permitting degrees of freedom in the design and creation of spatially addressable samples in an array. The LIBRARY STUDIO™ brand software allows for interface with the pumping system to control dispensing amounts, according to predefined amounts. The IMPRESSIONIST™ brand software in turn controls the translation of the motion plate so that desired compositions or gradients can be prepared at predetermined locations on the substrate.

In some embodiments, the delivery process is repeated to provide materials with as few as two components, although the process may be readily adapted to form materials having 3, 4, 5, 6, 7, 8 or more components therein. The density of regions per unit area will be greater than 0.04 regions/cm$^2$, more preferably greater than 0.1 regions/cm$^2$, even more preferably greater than 1 region/cm$^2$, even more preferably greater than 10 regions/cm$^2$, and still more preferably greater than 100 regions/cm$^2$. In most preferred embodiments, the density of regions per unit area will be greater than 1,000 regions/cm$^2$, more preferably 10,000 regions/cm$^2$, and even more preferably greater than 100,000 regions/cm$^2$.

Using the dispenser systems discussed in commonly owned and copending U.S. patent application Ser. No. 08/327,513, previously incorporated by reference, the individual components or component mixtures can be delivered separately to regions on the substrate either sequentially or simultaneously. In a presently preferred embodiment, the components or component mixtures are sequentially delivered to either a single predefined region on the substrate or, alternatively, to multiple predefined regions on the substrate. For example, using dispenser having two nozzles, one or more first components can be delivered to regions on the substrate. Alternatively, using this same dispenser, a component can be simultaneously delivered to two different regions on the substrate. In this instance, the same component or, alternatively, two different components can be delivered. If the same component is delivered to both of the regions, it can be delivered at either the same or different concentrations. Similarly, using an dispenser having eight or more nozzles, for example, eight or more different components can be simultaneously delivered to a single region on the substrate or, alternatively, eight or more components (either the same or different) can be simultaneously delivered to eight or more different regions on the substrate.

It will be appreciated that the delivery of components to a predefined region may require the use of spraying systems to help direct or confine the components to a particular location on the substrate. Thus, suitable masking systems may be employed where desired. An example of one such system is disclosed, for instance, in U.S. patent application Ser. No. 5,985,356 to Schultz et al., referred to above, and hereby incorporated by reference.

Other systems may be employed as desired, including automated fluid dispensing systems. For example, the use of a fully automated fluid dispensing system is preferred for use in depositing the second component of the present invention, which typically will be provided in a liquid state.

The steps of delivering the first and second component may be repeated as desired to obtain the desired material loading.

Treatment of Substrates for Screening

Components prepared or processed in accordance with the above can, optionally, be further processed and/or treated as necessary through one or more steps (e.g., drying, calcining, sintering or otherwise heat-treating) so that a resulting solid is formed, having a relatively high surface area per unit volume, which can be screened as a candidate catalyst for catalytic properties. Such treatment may involve separate treatment of each of the components individually or together as a mixture.

More specifically, by way of example, if the fluid for delivering the second component is a liquid, preferably the liquid is driven off by a suitable drying or calcining operation. Though not critical to all applications, under optimal conditions, such step of removing the liquid is conducted in a manner and at a rate so that the surface structure of the overall admixture remains substantially in tact (i.e., undesired diffusion or sintering is avoided), but yet the metal precursor of the second component sufficiently decomposes or interacts with the first component so the resulting material can be screened for measurable catalytic properties.

As the skilled artisan will appreciate, heating times, temperatures and atmospheres can be adjusted as desired. Heating history, such as ramp rates and heating times, can affect the phase purity, crystallinity and properties of the resulting materials. For example, heating with multiple steps may be desired.

Of general importance for this invention, is that the one or more mixtures not react substantially with the substrate, unless intended (e.g., use of a silicon substrate and desiring Si in the formed material). Although some interdiffusion of molecules between the substrate and the one or more mixtures can be tolerated as a result of the drying, heating, calcining or sintering step(s), the bulk of the material made should not include components or molecules from the substrate. Heating times and temperatures can be adjusted to account for different mixtures in conjunction with different substrate compositions. In converse, however, the mixtures should remain associated with the regions on the substrate after drying, sintering, calcinating and/or heating. For example, in the case of a substrate containing dimples (i.e., regions), the materials should remain in the dimple. Also, by remaining associated with a region, the materials in the array typically cannot interdiffuse between adjacent regions.

Typically, drying is performed after one or both of the components are delivered to the substrate, and preferably a drying regimen is employed so undesirable warping or nonuniform shrinkage is avoided. In order to aid in surface quality of the dried material, an additive can be deposited onto the regions of the substrate prior to or when depositing the components or mixture of components. More typically, the drying agent is added to the component mixtures. The use of drying agents may change the surface tension, vapor pressure, solvent viscosity and other properties of the component mixtures as described, as the skilled artisan would appreciate. Such agents may also have an effect on other physical characteristics such as pore size and structure of the nascent solid. Such modifications may affect the surface quality of the dried material. Such additives can be selected from the group consisting of polymers (such as polyethylene glycol and polyvinyl alcohol), surfactants, formamide, oxalic acid, dimethyl formamide, glycerol and ethylene glycol. These additives may also assist in adhering the material to the region during drying. Drying can be done at a temperature ranging from ambient temperature to about 380° C. in air or other atmospheres for a time in the range of from about 30 minutes to about 2 days. Drying may also take place by other processes, such a freeze drying, supercritical drying or other drying techniques known to those of skill in the art. Alternatively or in addition to heating, drying can also be effected under suitable vacuum conditions.

After drying, the substrate with the dried mixture of components may optionally be further treated by being additionally heated or calcined for a prescribed time at a prescribed temperature under a prescribed atmosphere. Also, the temperature may be increased and decreased at controlled rates, using ramping rates possibly holding times and then further heating. Selection of the desired heat-treating depends on a number of factors, including without limitation the material being made, the components in the mixture, the solvent and the substrate. Depending on the substrate selected, and there may be more or less diffusion of substrate molecules into the material being made in a region. For example with a sapphire substrate, diffusion is typically not an issue at reasonable heating temperatures and times (such as below 1100° C. for 2 days); however with a silicon substrate it may be necessary to carefully control heating temperatures and times to avoid diffusion of silicon molecules into the material.

Typically, calcining, heat-treating temperatures (for calcining or other treatments) can range from about 100° C. to about 1100° C. The nature of the substrate and the reactivity of the substrate with the components dictate the upper temperature limit. The upper temperature limit may in turn create a limit on the heating time. Depending on the nature of the material being investigated, a number of different heating temperatures or regimens may be used. Moreover, atmospheres may be varied as desired, e.g., they may be inert or reactive, oxidizing or reducing.

More preferably, heat treating typically may be carried out according to a schedule that heats the components at a first temperature in the range of about room temperature to about 120° C. for a period of about 1 hour to about 4 hours. Thereafter, the array with the components is heated at a second temperature in the range of about 160° C. to about 220° C. for a period of about 1 hour to about 4 hours. Further heating can be carried out according to a schedule that heats the array with the components at a temperature in the range of about 300° C. to about 600° C. for a period of about 1 hour to about 12 hours and subsequently heats the array with the components at a second temperature in the range of about 600° C. to about 1200° C. for a period of about 1 minute to about 24 hours. The rate of heating is generally in the range of about 1–10° C./minute or in other embodiments at a rate of 1–3° C./minute. Optionally or additionally, rapid thermal annealing can be used for the heat treating step(s) where heating rates can be as high as 1000° C. per minute or greater. For example, after calcining, rapid thermal annealing is typically used to crystallize the members of the array. One advantage is that rapid thermal annealing minimizes diffusion between the substrate and members of the array.

The further calcining or heat-treating may be effected under a variety of atmspheres for effecting a particular transformation of the supported material precursor. For example, they atmosphere and temperature may be effective for oxidizing or reducing the supported material precursor, or may alternatively be inert or non-reactive. Inert atmospheres of nitrogen or argon gas are exemplary. The supported material precursor can likewise be reacted with various reactants (e.g., hydrogen sulfide), under suitable reaction conditions, to form the final supported material of interest for the particular reaction screen.

It will be readily apparent to those of skill in the art that the foregoing synthetic routes are intended to illustrate, and not restrict, the ways in which the components can be combined or reacted to form at least two supported materials, and in some embodiment, at least two different supported materials, on a single substrate. Other synthetic routes and other modifications known to and used by those of skill in the art (now or in the future) can be employed in connection with the present invention.

Prior to screening (or even in the earlier delivery steps) the amount of material or its density in a region of a substrate can be varied as desired, through one or more steps of measuring, adding, packing, or physically removing materials (e.g., grinding or scraping) according to predetermined parameters.

Characteristics of Preferred Arrays

The methods of the invention result in the formation of an array of different supported materials including supported catalysts or precursors thereof. Preferably, the catalytically active component or precursor thereof is impregnated into the catalyst support. However, as will be recognized, the concentrations of the first and second components of the mixture can be varied as desired to contact the desired amount of the metal precursor with the catalyst support. In this manner, it is contemplated that an array of materials can be prepared, according to the combinatorial aspects of the present invention, whereby gradients of concentrations of the precursor can result across a substrate, and a plurality of different materials will be generated on the substrate. Alternatively, arrays having stoichiometry, thickness or other chemical or physical gradients may be prepared.

Examples of ratios and techniques for forming a variety of arrays are illustrated in U.S. patent application Ser. No. 09/156,857 entitled "Formation of Combinatorial Arrays of Materials Using Solution-Based Methodologies," hereby incorporated by reference. Preferably an array is created having at least 3 different materials, more preferably at least 5, still more preferably at least 10. Amounts of different materials in excess of 10 are contemplated for a single array in accordance with the present invention. For instance, arrays may contain at least 12, 24, 36, 48, 96, 256, 500, 1000, 105, or 106 different materials. In some embodiments, the array can include 96×N different materials, where N ranges from 1 to about 20, and preferably from 1 to about 10 or from 1 to about 5.

By way of illustration, if there is a two component material being prepared, a phase space is formed to examine the complete range of component variation. A first array may be formed by selecting an amount consistent with the size of the region being used (discussed below) and mixing an appropriate molar amount of component A and component B so that the first region of the substrate contains 100% of component A and 0% of component B. The second region may contain 90% of component A and 10% of component B. The third region may contain 80% of component A and 20% of component B. This is repeated until a final region contains 0% of component A and 100% of component B. Array formation in this fashion applies to as many components as desired, including 3 component materials, 4 component materials, 5 component materials and 6 or more component materials.

Like techniques may be employed in preparing arrays having stoichiometry, thickness or other chemical or physical gradients.

Moreover, in another embodiment of the present invention, a method is provided for forming at least two different arrays of materials by delivering substantially the same components at substantially identical concentrations to regions on both first and second substrates and, thereafter, subjecting the components on the first substrate to a first set of reaction conditions or post-deposition processing or treating conditions and the components on the second substrate to a second set of reaction conditions or post deposition processing or treating conditions. Using this method, the effects of the various reaction parameters can be studied and, in turn, optimized. Reaction, processing and/or treatment parameters which can be varied include, for example, solvents, temperatures, times, pressures, the atmospheres in which the reactions, processing or treatments are conducted, the rates at which the reactions are quenched, etc. Other reaction or treatment parameters which can be varied will be apparent to those of skill in the art. Hence, one embodiment of the invention is where an array of materials, after its formation, is thereafter subjected to further processing (such as heat treating in an alternative atmosphere) to create an array of different materials.

The array can have as many materials as there are regions on the substrate. For purposes of this invention, the number of materials is typically equal to the number of regions on the substrate, unless certain regions are left empty. The number of regions on the substrate is discussed below, but applies as well to the number of materials.

In some embodiments, a region on the substrate and, therefore, the area upon which each material is synthesized is smaller than about 25 cm$^2$, preferably less than 10 cm$^2$, more preferably less than 5 cm$^2$, even more preferably 1 cm$^2$, still more preferably less than 1 mm$^2$, and still more preferably less than 0.5 mm$^2$. In most preferred embodiments, the regions have an area less than about 10,000 $\mu$m$^2$, preferably less than 1,000 $\mu$m$^2$, more preferably less than 100 $\mu$m$^2$, and even more preferably less than 10 $\mu$m$^2$.

Screening

The supported material arrays prepared in accordance with the methods of the present invention lend themselves to the testing of diverse properties, particularly those bearing upon or revealing information about the ability of members of the array to serve as a catalyst for heterogeneous catalysis. Thus, properties that one can test for include catalysis. Catalysis can be determined by considering catalytic activity, conversion, selectivity, yield, etc. Such catalysis parameters can be determined by determining the presence or absence of, and/or by quantifying a particular reaction product of interest, as for example by chromatography such as gas chromatography or mass spectroscopy. Moreover, the catalytic nature of the supported materials can be determined by evaluating the radiative, emissivity, transmissivity or other, thermal or optical properties in situ during the reaction, whereby catalyst efficacy is studied by reference to energy or some other measurable phenomena yielded during a reaction. The supported catalyst materials may also be analyzed for purposes of and for materials characterization (e.g., using infrared, x-ray, spectroscopic or chromatographic techniques, which analyze catalyst efficacy by examining reactions products). Arrays of materials may be screened for more than one property.

By way of example, X-ray diffraction (XRD) and X-ray fluorescence (XRF) can be used to determine the material crystal structure and composition, respectively. Libraries of materials prepared can be screened. For instance, libraries of potential catalysts are screened for the reaction of interest using, for example a scanning mass spectrometer, as disclosed in commonly owned copending U.S. patent application Ser. No. 08/946,730, filed Oct. 8, 1997, which is incorporated herein by reference. Catalysts may also be screened for the reaction of interest using, for example a scanning photothermal deflection spectrometer, as disclosed in commonly owned copending U.S. patent application Ser. No. 09/039,991, filed Mar. 16, 1998, which is incorporated herein by reference. A parallel microreactor can likewise be used to screen the array of catalysts, such as is disclosed in commonly owned copending patent application U.S. Ser. No. 60/122,704, noted above. Another catalyst screening method uses a fixed bed parallel reactor, as disclosed in commonly owned copending U.S. patent application Ser. No. 09/093,870, filed Jun. 9, 1998, which is incorporated herein by reference. Of course, other useful screening methods may be employed, and the present invention is not confined merely to the use of the above screening methods.

By way of further illustration, in the instance of using the present method and system for catalyst screening, after catalytic screening, focused libraries from within the compositional regions shown to have the highest % yield (% selectivity x% conversion) are prepared. In addition, bulk catalyst samples of identical compositions are prepared according to conventional methods for the purpose of structural and catalytic comparisons.

In general for this heterogeneous reaction, regularity of the material's surface quality is important since different film qualities may result in different relative surface areas across the array of catalysts. Additionally, samples within a combinatorial library should be as uniform as possible in a macroscopic sense, i.e., the surface areas should be similar. Thus, as discussed in the section on treatment of substrates for screening, it is desirable to avoid warpage or non-uniform shrinkage in the sample. These relationships may be probed by the use of in situ analytical methods. The characterization of composition, phase, and structure are all elements in ascertaining the relationship between flat surface catalysts and bulk catalysts. Confirmation that the material being measured in the flat surface array is the same as the material being measured after scale-up allows catalytic trends to be extracted from flat surface library data and applied toward bulk samples. Composition may be confirmed through a comparison of nominal stoichiometry with XRF data from flat surface catalysts. Phase identification and structural characterization may both be determined through the use of XRD and electron microscopy. Thus, it can be seen how those of skill in this art can effectively utilize the methods of this invention for a combinatorial materials science research program.

One of the advantages of the present invention is that arrays can be prepared on a substrate and tested, while on the substrate, following their preparation (and without an additional transfer off of the substrate or other additional handling of the supported materials). Hence, the array of materials can be advantageously screened with the array of supported catalyst materials still located on the substrate, i.e., without the need to transfer the materials of the array from the substrate. The materials can also be screened, in alternative embodiments, with the materials on the array within the same chamber where the array is synthesized, without the need to transfer to an external test site. The present invention thus allows many materials (e.g., greater than 4) to be tested simultaneously in parallel, or in rapid serial manner, without the need to remove the substrate from the test apparatus, or replace it with a different substrate. In this manner, the achievement of large amounts of catalyst efficacy data is possible over a short period of time. Moreover, because the amounts needed for screening are relatively small, (e.g., less than 1 gram, and preferably less than 1 milligram), time and expense savings on sample preparation are also realizable.

Alternative Substrate Embodiments

In one preferred embodiment, the components or materials in the individual regions should be prevented from moving to adjacent regions. Most simply, this can be ensured by leaving a sufficient amount of space between the regions on the substrate so that the various components cannot interdiffuse between reaction regions. Moreover, this can be ensured by providing an appropriate barrier between the various regions on the substrate. In one approach, a mechanical device or physical structure defines the various regions on the substrate. A wall or other physical barrier, for example, can be used to prevent the reactant components in the individual reaction regions from moving to adjacent reaction regions. This wall or physical barrier may be removed after the synthesis is carried out. One of skill in the art will appreciate that, at times, it may be beneficial to remove the wall or physical barrier before screening the array of materials.

In another approach, a hydrophobic material, for example, can be used to coat the region surrounding the individual reaction regions. Such materials prevent aqueous (and certain other polar) solutions from moving to adjacent reaction regions on the substrate.

Alternatively or additionally, a well or dimple, or other recess, can be used to prevent the reactant components in the individual reaction regions from moving to adjacent reaction regions. If the substrate used in the present invention is to contain dimples or other recesses, the dimples should be sufficiently small to allow close packing on the substrate. Preferably, the dimples will be less than about 5 mm in diameter, less than 1 mm in diameter, preferably less than 0.5 mm in diameter, more preferably less than to 10,000 $\mu$m in diameter, even more preferably less than 100 $\mu$m in diameter, and still more preferably less than 25 $\mu$m in diameter. Typically a dimple of about 1–3 mm is employed. In some embodiments, the depth of such dimples will preferably be less than 100 $\mu$m and more preferably less than 25 $\mu$m and most preferably less than 10 $\mu$m below the upper surface of the substrate. In other embodiments, for example where a greater bulk of material is desired, the depth of such dimples will be in the range of about 10 $\mu$m to about 1,000 $\mu$m.

One preferred approach here is to have a dimple created by bead blasting, which creates a dimple surface that is rough enough to assist in adhesion of the material to the dimple.

Dimples having these characteristics can be produced by a variety of techniques including laser, pressing, or etching techniques. A suitable dimpled substrate surface can, for example, be provided by pressing the substrate with an imprinted "master" such as those commonly used to prepare compact optical disks. In addition, an isotropic or an isotropic etching technique employing photolithography can be employed. In such techniques, a mask is used to define the reaction regions on the substrate. After the substrate is irradiated through the mask, selected regions of the photoresist are removed to define the arrangement of reaction regions on the substrate. The dimples may be cut into the substrate with standard plasma or wet etching techniques. If the substrate is a glass or silicon material, suitable wet etch materials can include hydrogen fluoride, or other common wet etchants used in the field of semiconductor device fabrication. Suitable plasma etchants commonly used in the semiconductor device fabrication field can also be employed. Such plasma etchants include, for example, mixtures of halogen containing gases and inert gases. Typically, a plasma etch will produce dimples having a depth of less than 10 $\mu$m, although depths of up to 50 $\mu$m may be obtained under some conditions.

Another method for preparing a suitably dimpled surface employs photochemically etchable glass or polymer sheets. For example, a photochemically etchable glass known as "FOTOFORM" is available from Coming Glass Company (New York). Upon exposure to radiation through a mask, the glass becomes soluble in aqueous solutions. Thereafter, the exposed glass is simply washed with the appropriate solution to form the dimpled surface. With this material, well-defined dimples can be made having aspect ratios of 10 to 1 (depth to diameter) or greater, and depths of up to 0.1 inches. Dimple diameters can be made as small as 25 $\mu$m in a 250 $\mu$m thick glass layer. Moreover, the dimpled surface can contain thereon an adsorbent (for example, cellulose) to which the components of interest are delivered.

Even when a dimpled surface is employed, it is often preferred to ensure that the substrate material is not wetted beyond the region. Most simply, this can be ensured by leaving a sufficient amount of space between the regions on the substrate so that the various components cannot interdiffuse between reaction regions. In addition, other techniques can be applied to control the physical interactions that affect wetting, thereby ensuring that the solutions in the individual reaction regions do not wet the surrounding surface and contaminate other reaction regions. Whether or not a liquid droplet will wet a solid surface is governed by three tensions: the surface tension at the liquid-air interface, the interfacial tension at the solid-liquid interface and the surface tension at the solid-air interface. If the sum of the liquid-air and liquid-solid tensions is greater than the solid-air tension, the liquid drop will form a bead (a phenomenon known as "lensing"). If, on the other hand, the sum of the liquid-air and liquid-solid tensions is less than the solid-air tension, the drop will not be confined to a given location, but will instead spread over the surface. Even if the surface tensions are such that the drop will not spread over the surface, the contact or wetting angle (i.e., the angle between the edge of the drop and the solid substrate) may be sufficiently small that the drop will cover a relatively large area (possibly extending beyond the confines of a given reaction region). Further, small wetting angles can lead to formation of a thin (approximately 10 to 20°) "precursor film" which spreads away from the liquid bead. Larger wetting angles provide "taller" beads that take up less surface area on the substrate and do not form precursor films. Specifically, if the wetting angle is greater than about 90°, a precursor film will not form.

Methods for controlling chemical compositions and, in turn, the local surface free energy of a substrate surface include a variety of techniques apparent to those in the art. Chemical vapor deposition and other techniques applied in the fabrication of integrated circuits can be applied to deposit highly uniform layers on selected regions of the substrate surface. If, for example, an aqueous reactant solution is used, the region inside the reaction regions may be hydrophilic, while the region surrounding the reaction regions may be hydrophobic. As such, the surface chemistry can be varied from position to position on the substrate to control the surface free energy and, in turn, the contact angle of the drops of reactant solution. In this manner, an array of reaction regions can be defined on the substrate surface.

In one method, the substrate is prepared for receiving the mixture of components by starting with a flat silicon substrate and chemically modifying it using organosilane reagents, such as $CH_3(CH_2)_nSiCl_3$ where 0>n>17. The organosilane reagent is chosen to lend particular wetting characteristics to the substrate surface. Typically, the substrate is sonicated for about 15–20 minutes in isopropanol or another alcohol or with other times and solvents to clean the substrate. The substrate is then rinsed with distilled and deionized water, dried under a nitrogen gas jet and heated at 120° C. for about 20–30 minutes. The exact conditions for this cleaning and drying can vary depending on the exact silane chosen as well as the substrate chosen. After cooling, the substrate is placed in a 5% v/v solution of the silane in a solvent (such as dichloromethane), then removed from the solvent, washed (for example with methanol), and then dried under a nitrogen gas jet. This entire process can be repeated one or more times. The silane used to modify the surface is chosen to affect the wetting properties of the substrate appropriate for the common solvent employed to ensure isolation of the regions on the substrate, thereby encouraging the mixture of components to remain in the regions. After the substrate is chemically modified through silanization, an array of regions is created by bead blasting through a patterned mask with grit. A preferred grit is 50 μm alumina grit. The array of dimples takes the pattern of the mask. In a preferred pattern, a plurality of round 3 mm diameter regions is constructed on the substrate using a stainless steel mask with sufficient spacing so that the materials do not intermix, e.g., about 2 to about 4 mm. Once the substrate is prepared, solutions of the starting components are deposited in the individual regions on the substrate.

Essentially, any conceivable substrate can be employed in the invention. The substrate can be organic, inorganic, biological, nonbiological, or a combination of any of these, existing as particles, strands, precipitates, gels, sheets, tubing, spheres, containers, capillaries, pads, slices, films, plates, slides, etc. The substrate can have any convenient shape, such a disc, square, sphere, circle, etc. The substrate is preferably flat, but may take on a variety of alternative surface configurations. For example, the substrate may contain raised or depressed regions on which the synthesis of diverse materials takes place. The substrate may be any of a wide variety of materials including, for example, polymers, plastics, Pyrex, quartz, resins, silicon, silica or silica-based materials, carbon, metals, inorganic glasses, inorganic crystals, membranes, etc. Other substrate materials will be readily apparent to those of skill in the art upon review of this disclosure. Surfaces on the solid substrate can be composed of the same materials as the substrate or, alternatively, they can be different, i.e., the substrates can be coated with a different material. Moreover, the substrate surface can contain thereon an adsorbent (for example, cellulose) to which the components of interest are delivered. The most appropriate substrate and substrate-surface materials will depend on the class of materials to be synthesized and the selection in any given case will be readily apparent to those of skill in the art.

In another embodiment, a catalyst carrier is deposited over at least a portion of the substrate as a continuous layer or film, and spots of precursor are deposited in discrete regions. In some embodiments, it is contemplated that the substrate includes a plurality of vials maintained on a common substrate.

EXAMPLES

The starting reagents are purchased from commercial sources and used as received unless otherwise noted. Some alkoxide components are handled in an argon or nitrogen inert atmosphere glove box (from Vacuum Atmospheres). However, the techniques of this invention generally allow the synthesis and manipulation of these components in air.

A catalyst library is prepared on a quartz substrate which contains a plurality of regions. The preparation of the substrate is described, for instance, in publication WO 98/15969, (e.g., page 36), incorporated by reference herein. For this specific application 3"×3" square quartz wafer is silanized using $CH_3(CH_2)_7SiCl_3$. An array of 16×16 wells is formed in the wafer by bead blasting using a suitable mask. Each well is 2.2 mm in diameter and deep enough so that all material subsequently deposited in that well is below the top surface of the wafer. For the current example the well depth is about 0.1 mm.

One or more of a powder carrier is suspended in a liquid including water, a polyol, and optionally an alcohol, an aggregating agent or both. Water ranges from about 30 to about 75 parts, and the polyol is about 25 to about 40 parts. Optionally a colloidal suspension is used. An amount of the carrier is dispensed to a region on a substrate and dried. The resulting carrier present has a surface area of at least about 90 $m^2/g$. The pore volume is at least about 0.3 to about 0.8 cc/g. The average pore diameter is about 4 to about 10 nm. The following parts (a)–(e) illustrate alternative carriers.

(a) A carbon carrier (e.g., Darco G-60 from American Norit Co.), is supplied as a 100 mesh power, and is suspended in a liquid having about 75 parts water and parts ethylene glycol, and also containing about 0.3 parts methyl cellulose. A 2.0 μL portion of the suspension is dispensed onto regions on a quartz wafer using a CAVRO robot. The wafer is dried in an oven at 120° C. for 12 h. The deposited regions on the wafer thus contain about 125 μg of dry Carbon carrier.

(b) A titania carrier (e.g., T-1156 from Cerac), is supplied as a 325 mesh powder, and is suspended in a liquid having about 40 parts ethylene glycol, 30 parts water, and 30 parts 2-methoxyethanol. A 2.0 μL portion of the suspension is dispensed onto regions on the quartz wafer using a CAVRO robot. The wafer is dried in an oven at 120° C. for 12 h. The deposited regions on the wafer thus contain about 125 μg of dry titania carrier.

(c) An alumina carrier (e.g., Catalox Sba-150 from Condea), is supplied as a 0 μm powder, and is suspended in a liquid having 40 parts ethylene glycol, 30 parts water, and 2-methoxyethanol. A colloidal $Al_2O$ (A120DW from Nyacol), is added to the suspension (about 2.5% by volume). A 2.0 μL portion of the suspension is dispensed onto regions on the quartz wafer using a CAVRO robot. The wafer is dried in an oven at 120° C. for 12 h. The deposited regions on the wafer thus contain about 250 μg of dry titania carrier. The surface area of the powder is about 90–210 $m^2/g$, the pore volume is about 0.35–0.50 cc/g, and the average pore diameter is 4–10 mm.

(d) A silica carrier (e.g., 28,853-5 from Aldrich parts), is supplied as a 5–25 μm powder and is suspended in a liquid 40 parts ethylene glycol, 30 parts water, and 30 parts 2-methoxyethanol. A 2.0 μL portion of the suspension is dispensed onto regions on the quartz wafer using a CAVRO robot. The wafer is dried in an oven at 120° C. for 12 h. The deposited regions on the wafer thus contain about 20 μg of dry titania carrier. The surface area of the powder is about 500 $m^2/g$, the pore volume is about 0.75 cc/g, and the average pore diameter is 6 nm.

(e) a $ZrO_2$ catalyst carrier (e.g, FZO936/01 from MEL Chemicals), is supplied as a 1–3 μm powder and is suspended in a liquid consisting of 40% ethylene glycol, 30% water, and 30% 2-methoxyethanol. A 1.5 μL portion of the suspension is dispensed onto regions on the quartz wafer using a CAVRO robot. The wafer is allowed to air dry for 12 h. The wafer is then further dried in an oven at 120° C. for 1 hour. The deposited regions on the wafer thus contain about 250 μg of dry $ZrO_2$ carrier.

Nitrate solutions of Ni, Pd, and Pt are mixed in a microtitre plate using a CAVRO robot to form a 16×16 array of solutions with varying concentrations of the three metals. Using automated liquid dispensing a 250 nL portion of each solution is impregnated into the carrier in a unique predefined region of the quartz wafer. The wafer is then calcined at 120° C. for 2 h, at 180° C. for 2 h, and at 380°

C. for 4 h. The array of catalysts are then screened for an amination reaction using a reactor, such as that disclosed in U.S. Pat. No. 5,959,297 (Weinberg et al; Sep. 28, 1999), hereby incorporated by reference, and U.S. patent application Ser. No. 60/122,704. Alternative screening techniques may be employed such as, without limitation, a scanning mass spectrometer type reactor or a parallel flow reactor coupled to a suitable detector system. See U.S. patent application Ser. No. 5,959,297 hereby incorporated by reference.

The catalyst loading on the impregnated library is about 250 μg per well. (CCD camera image data is collected). The impregnated catalysts are run for 10 minutes and the camera exposure was 1 second. The impregnated library shows a relatively high catalyst activity. Also the variation in activity between catalyst spots in the impregnated library is relatively smooth, and closely approximates that expected for a library designed with smooth concentration gradients. This demonstrates that by use of the present invention, active, reproducible, and consistent catalyst libraries can be produced.

Example 2

An array of materials is prepared for screening. The first component is a metal oxide suspended in a slurry, which is delivered to a 3×3 inch quartz wafer having 256 bead blasted wells defined therein. For deposition of a slurry of 250 micrograms of zirconium oxide (FZO 936/01; MEI Chemicals), the depth of the wells should be about 0.067 mm for a 2.2 mm spot diameter; and about 0.111 mm for a 1.5 mm spot diameter (which is achieved by about 16 passes with a hand held bead blaster). The metal oxide has a particle size of about 1–2 microns, a surface area of about 80 to about 110 square meters per gram, a pore diameter of about 8–9 nm and a pore volume of about 0.15–0.2 cc/g. About 0.50 g of the oxide is slurried in about 3 ml of a solvent (e.g., for a 2.2 mm spot: 40% ethylene glycol, 30% water and 30% 2-MEO; for a 1.5 mm spot: 40% ethylene glycol and 60% water). About 1.5 microliters is dispensed.

The slurry is deposited in the wells in parallel, or semi-parallel using an automated robot system, (e.g., CAVRO model RSP9652, by Cavro Scientific Instruments). The amounts of the slurry to deposit in each location can be controlled by data entry into a computer running LIBRARY STUDIO (trademark) brand software of Symyx Technologies. After heating to about 140 degrees C., approximately 250 micrograms of oxide is deposited in each well and results in about 0.0375 microliters of pore volume. The location of the well (relative to the dispensing syringe of the robot) is controlled by a computer running IMPRESSIONIST (trademark) brand software of Symyx Technologies, Liquid is removed from the deposited slurry by drying either at room temperature for an extended period, at elevated temperature or both.

Into each well, the second component is deposited in the interstices of the mass of dried first component using a nano-dispensing robot (e.g., Microdrop Model 3000, from BioDot, Inc.) in rapid serial succession. For the above example, where the resulting interstitial volume is about 0.0375 microliters (though as little as about 10 nanoliters can be dispensed), approximately 0.0375 microliters of an aqueous metal nitrate (e.g., nickel, rhodium, ruthenium, and mixtures thereof) solution is introduced into each well. The wafer is placed on a motion plate, and the location of the well (relative to the dispensing syringe of the robot) is controlled by a computer running IMPRESSIONIST (trademark) brand software of Symyx Technologies, with the amounts being controlled by LIBRARY STUDIO brand software.

The impregnated materials are then dried either at room temperature or at elevated temperature. For example, using a Thermolyne Model No. 48000 furnace the wafers with the slurry are dried at elevated temperature. The wafer with the deposited material is placed in the furnace where temperature is ramped up at about one degree C. per minute to about 120 degrees C., where the temperature is maintained constant for about 2 hours. Then the temperature is raised at about one degree C. per minute to about 180 degrees C., where it is then held for about 2 hours. Finally, the material is ramped about 2 degrees C. per minute to 380 degrees C., where it is held for about 4 hours. Like results are possible using different times and temperatures, with attention given to maintaining the integrity of the pore structure defined through the first component as the metal precursor is decomposed.

The above heating may occur in one step or multiple steps, and may employ one or additional furnaces, varying atmospheres (e.g., a reducing atmosphere such as is provided by hydrogen gas) or both. For example, a Lindberg/Blue tube furnace (e.g., Model No. STF55346C) having a hydrogen atmosphere may be used.

Upon removal from the furnace the resulting material is screened for catalytic activity using mass-spectrometry techniques such as disclosed in U.S. patent application Ser. No. 5,959,297 hereby incorporated by reference.

Example 3

A library of materials is prepared using combinatorial methods. A first substrate is used. The first substrate is a generally hydrophobic and chemical resistant material, such as a Teflon block with a plurality of wells defined therein. The wells are of sufficient diameter to house removable capsules or cells for receiving the first and second components. At the outset a catalyst carrier including the first component is placed in the wells of the first substrate in its dry state or in a liquid state (which is then dried). The second component is introduced into the wells and the entire substrate is placed in a furnace to dry.

Upon drying, a second substrate is provided. The second substrate is generally a good high temperature material, such a stainless steel. That is, is can be used for heat treating at temperatures above about 150 degrees C. without significant distortion or degradation. The second substrate has a well pattern defined therein having a substantial mirror image to the pattern of the first substrate. Within each well, there is placed a removable container or cell (e.g., a capsule).

The first substrate is brought together with the second substrate in a opposing face to face mating relationship, so that the removable containers or cells penetrate into the wells of the first substrate. The mated substrates are then rotated to effectuate transfer of the library of materials in the first substrate to the second substrate. Thereafter, the materials can be treated at high temperatures, screened for useful properties (e.g., using gas chromatography techniques), or both.

Depending upon the nature of the components introduced or the results desired, it may be possible to use only a single substrate and obtain like results without transferring between substrates.

Although the invention has been described with particular reference to certain preferred embodiments thereof, variations and modifications can be effected within the spirit and scope of the following claims.

What is claimed is:

1. A method for forming an array of supported catalyst materials, said method comprising the steps of:

a) discretely providing a catalyst carrier in a liquid suspension to each of at least four regions on a substrate said liquid suspension further including at least one agent to alter its viscosity, surface or wetting characteristics and facilitate handling;

b) removing at least a portion of said liquid from said suspension to form an array of porous catalyst carriers;

c) providing in a liquid medium a catalytically active component or a precursor thereof to said at least four regions on said;

d) impregnating said array of catalyst carriers with said catalytically active component or a precursor thereof on said substrate to form an array of supported materials for screening for heterogeneous catalytic properties; and e) removing at least a portion of said liquid medium.

2. A method according to claim 1 further comprising treating said substrate for modifying the local surface free energy of said deposition surface.

3. The method according to claim 1 further comprising heat treating said array.

4. The method according to claim 1 further comprising calcining said array.

5. The method according to claim 1 further comprising screening said array for heterogeneous catalytic properties while said materials are on said substrate.

6. The method according to claim 1 wherein the composition of said catalyst carrier is different at different locations across the substrate.

7. The method according to claim 1 wherein the composition of said catalytically active component or a precursor thereof is different at different locations across the substrate.

8. The method according to claim 1 wherein said catalyst carrier is selected from carbon, oxides of Zr, Ti, Al, Si, or mixtures thereof.

9. The method according to claim 1 wherein said catalytically active component or a precursor thereof includes a metal selected from the group consisting of noble metals, transition metals, transition-metal containing compounds or mixtures thereof.

10. The method according to claim 1 wherein said supported materials are physically separated.

11. The method according to claim 1 wherein said supported materials are physically continuous.

12. The method according to claim 1 wherein said catalyst carrier is provided in a slurry.

13. The method according to claim 1 wherein catalyst carrier is provided in a sol-gel.

14. The method according to claim 1 wherein said catalyst carrier is provided in a colloidal suspension.

15. The method according to claim 1 wherein said array includes at least 5 different materials.

16. The method according to claim 1 wherein said array includes at least 12 different materials.

17. The method according to said claim 1 wherein said array includes at least 24 different materials.

18. The method according to claim 1, wherein said providing of said carrier is after said providing of said catalytically active component or precursor thereof.

19. The method according to claim 1, wherein said providing of said carrier precedes said providing of said catalytically active component or precursor thereof.

20. The method according to claim 1, wherein said porous catalyst carriers have a surface area of about 80 $m^2/g$ to about 110 $m^2/g$.

21. The method according to claim 1, wherein said porous catalyst carriers have a surface area of at least about 90 $m^2/g$.

22. The method according to claim 1, wherein said porous catalyst carriers have a pore volume of about 0.3 to about 0.8 cc/g.

23. The method according to claim 1, wherein said porous catalyst carriers have a pore diameter of about 4 to about 10 nm.

24. The method according to claim 1, wherein said porous catalyst carriers have a surface area of about 80 $m^2/g$ to about 110 $m^2/g$, a pore volume of about 0.3 to about 0.8 cc/g, and a pore diameter of about 4 to about 10 nm.

25. The method of claim 24 wherein said providing steps are performed with an automated fluid dispensing system.

26. The method of claim 25 wherein each of said providing steps includes dispensing simultaneously to each of said regions.

27. The method according to claim 22, wherein said liquid medium impregnates said porous catalyst carrier by way of capillary action.

28. The method according to claim 1, further comprising conducting X-ray diffraction analysis of said array of supported materials while said materials are on said substrate.

29. A method for forming an array of supported catalyst materials, said method comprising the steps of:
   a) discretely providing a catalyst carrier in a liquid suspension to each of at least four regions on a substrate;
   b) drying said suspension to form an array of porous catalyst carriers having a surface area of about 80 $m^2/g$ to about 110 $m^2/g$, a pore volume of about 0.3 to about 0.8 cc/g, and a pore diameter of about 4 to about 10 nm;
   c) providing in a liquid medium a catalytically active component or a precursor thereof to said at least four regions on said substrate;
   d) impregnating said array of catalyst carriers with said catalytically active component or a precursor thereof on said substrate to form an array of supported materials;
   e) calcining said impregnated array; and
   f) screening said calcined array of supported materials.

30. The method according to claim 29 wherein catalyst carrier is provided in a sol-gel.

31. The method according to claim 29 wherein said catalyst carrier is provided in a colloidal suspension.

32. The method according to claim 29, further comprising conducting X-ray diffraction analysis of said array of supported materials while said materials are on said substrate.

33. The method according to claim 30, further comprising conducting X-ray diffraction analysis of said array of supported materials while said materials are on said substrate.

34. The method according to claim 31, further comprising conducting X-ray diffraction analysis of said array of supported materials while said materials are on said substrate.

35. The method according to claim 29, wherein said catalyst carrier is an oxide.

36. A method for forming an array of supported catalyst materials, said method comprising the steps of:
   a) discretely providing a plurality of liquid suspensions each consisting essentially of a different catalyst carrier, to a different region on a substrate;
   b) drying said suspensions to form a plurality of different porous oxide catalyst carriers on said substrate;
   c) providing in a liquid medium a catalytically active component or a precursor thereof to said at least four regions on said substrate, said catalytically active component or a precursor thereof including at least 3 component materials;
   d) impregnating said array of catalyst carriers with an amount of said catalytically active component or a precursor thereof that corresponds approximately with the amount of pore volume of said catalyst carrier on said substrate to form an array of supported materials;

e) calcining said impregnated array; and f) conducting X-ray diffraction analysis of said array of supported materials while said materials are on said substrate.

37. The method according to claim 36, wherein at least one of said suspensions is a sol-gel.

38. The method according to claim 36, wherein at least one of said suspensions is a colloidal suspension.

39. The method according to claim 36, wherein said liquid suspension includes at least one agent to alter its viscosity, surface or wetting characteristics and facilitate handling.

40. A method for forming an array of supported catalyst materials, said method comprising the steps of:

a) discretely providing a plurality of liquid suspensions each consisting essentially of a different catalyst carrier, to a different region on a substrate;

b) drying said suspensions to form a plurality of different porous oxide catalyst carriers on said substrate;

c) providing in a liquid medium a catalytically active component or a precursor thereof to said at least four regions on said substrate;

d) impregnating said array of catalyst carriers with an amount of said catalytically active component or a precursor thereof that corresponds approximately with the amount of pore volume of said catalyst carrier on said substrate to form an array of supported materials;

e) calcining said impregnated array; and f) conducting X-ray diffraction analysis of said array of supported materials while said materials are on said substrate.

41. A method for forming an array of supported catalyst materials, said method comprising the steps of:

a) discretely providing a catalyst carrier in a liquid suspension to each of at least four regions on a substrate, b) drying said suspensions to form a plurality of different porous oxide catalyst carriers on said substrate;

c) providing in a liquid medium a catalytically active component or a precursor thereof to said at least four regions on said substrate, said catalytically active component or a precursor thereof including at least 3 component materials;

d) impregnating said array of catalyst carriers with an amount of said catalytically active component or a precursor thereof that corresponds approximately with the amount of pore volume of said catalyst carrier on said substrate to form an array of supported materials;

e) calcining said impregnated array; and f) screening said array of supported materials while said materials are on said substrate.

42. The method according to claim 1 wherein said catalyst carrier is comprised of spherical beads.

43. The method according to claim 42 wherein variation in diameter size for said spherical beads is less than about 25 percent.

44. The method according to claim 43 wherein variation in diameter size for said spherical beads is less than about 10 percent.

45. The method according to claim 44 wherein variation in diameter size for said spherical beads is less than about 5 percent.

46. The method according to claim 1 wherein said catalyst carrier has a particulate size in the range from about 0.01 micron to about 300 microns.

47. The method according to claim 12, wherein said catalyst carrier has a particulate size in the range from about 0.01 micron to about 100 microns.

48. The method according to claim 12 wherein said catalyst has a particulate size in the range from about 1 micron to about 20 microns.

* * * * *

UNITED STATES PATENT AND TRADEMARK OFFICE
CERTIFICATE OF CORRECTION

| | | |
|---|---|---|
| PATENT NO. | : 6,627,571 B1 | Page 1 of 1 |
| APPLICATION NO. | : 09/516669 | |
| DATED | : September 30, 2003 | |
| INVENTOR(S) | : Lugmair et al. | |

It is certified that error appears in the above-identified patent and that said Letters Patent is hereby corrected as shown below:

Title Page; (75) Inventors: should include --Daniel M. Giaquinta, Mountain View, CA (US)--

Col. 23, line 10, --substrate-- should be inserted between "said" and the semicolon Signed and Sealed this Nineteenth Day of February, 2008

JON W. DUDAS
*Director of the United States Patent and Trademark Office*